United States Patent
Fahrny

(10) Patent No.: US 8,938,401 B2
(45) Date of Patent: Jan. 20, 2015

(54) SYSTEMS AND METHODS FOR SIGNALING CONTENT RIGHTS THROUGH RELEASE WINDOWS LIFE CYCLE

(75) Inventor: James W Fahrny, Parker, CO (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 908 days.

(21) Appl. No.: 12/372,539

(22) Filed: Feb. 17, 2009

(65) Prior Publication Data

US 2010/0211798 A1    Aug. 19, 2010

(51) Int. Cl.
*G06F 21/00* (2013.01)
*G06F 21/10* (2013.01)
*H04N 21/4627* (2011.01)
*H04N 21/8355* (2011.01)

(52) U.S. Cl.
CPC ............ *G06F 21/10* (2013.01); *H04N 21/4627* (2013.01); *H04N 21/8355* (2013.01); *G06F 2221/0731* (2013.01); *G06F 2221/0768* (2013.01); *G06F 2221/2137* (2013.01)
USPC .................................. 705/51; 705/57; 705/59

(58) Field of Classification Search
USPC ................................................ 705/51, 57, 59
See application file for complete search history.

(56) References Cited

U.S. PATENT DOCUMENTS

| | | | |
|---|---|---|---|
| 6,842,994 B2 * | 1/2005 | McInroy ............................ 33/613 |
| 7,136,945 B2 * | 11/2006 | Gibbs et al. .......................... 710/62 |
| 2002/0032905 A1 * | 3/2002 | Sherr et al. ............................. 725/38 |
| 2002/0095679 A1 * | 7/2002 | Bonini ............................. 725/74 |
| 2004/0059678 A1 * | 3/2004 | Stefik et al. ........................ 705/51 |
| 2004/0098347 A1 * | 5/2004 | Atkinson et al. ................. 705/59 |
| 2004/0177044 A1 * | 9/2004 | Peterka ............................. 705/57 |
| 2004/0216163 A1 * | 10/2004 | Whitcomb ....................... 725/74 |
| 2005/0125405 A1 * | 6/2005 | Watson et al. ..................... 707/7 |
| 2006/0085354 A1 * | 4/2006 | Hirai ................................ 705/59 |
| 2006/0242069 A1 | 10/2006 | Peterka et al. |
| 2007/0031122 A1 * | 2/2007 | Yamagata et al. ............... 386/95 |
| 2007/0078777 A1 * | 4/2007 | Demartini et al. ............... 705/59 |
| 2007/0220575 A1 * | 9/2007 | Cooper et al. ................. 725/118 |
| 2008/0103977 A1 * | 5/2008 | Khosravy et al. ............... 705/59 |
| 2008/0120241 A1 * | 5/2008 | Kim ................................. 705/59 |
| 2008/0163336 A1 * | 7/2008 | Feng et al. ........................ 726/1 |
| 2008/0209575 A1 * | 8/2008 | Conrado et al. ................ 726/29 |
| 2008/0229094 A1 * | 9/2008 | Moon et al. ..................... 713/150 |
| 2008/0256646 A1 * | 10/2008 | Strom et al. ..................... 726/29 |
| 2009/0103774 A1 * | 4/2009 | Grossman ..................... 382/100 |
| 2009/0290713 A1 * | 11/2009 | Belenky ......................... 380/277 |
| 2010/0287609 A1 * | 11/2010 | Gonzalez et al. ............... 726/14 |

(Continued)

FOREIGN PATENT DOCUMENTS

WO         0206931 A2      1/2002
WO    WO2013/072374 A1 *  5/2013  ............. G06F 21/00

OTHER PUBLICATIONS

U.S. Appl. No. 61/091,986, filed Aug. 26, 2008.*

(Continued)

*Primary Examiner* — Calvin Cheung
(74) *Attorney, Agent, or Firm* — Banner & Witcoff, Ltd.

(57) ABSTRACT

Systems and methods for controlling the use of audio, video and audiovisual content are provided. A data structure includes content usage rights for multiple release windows. The usage rights may be encoded in the content or otherwise bound to the content. Playback devices are configured to access the appropriate usage rights and control usage in accordance with the usage rights.

9 Claims, 5 Drawing Sheets

(56) References Cited

U.S. PATENT DOCUMENTS

2011/0154382 A1* 6/2011 Chow et al. .................. 725/5
2012/0066134 A1* 3/2012 Washiro ....................... 705/59

OTHER PUBLICATIONS

"What is digital watermark?", published Jan. 28, 2008, Retrieved from Wayback Machine at http://web.archive.org/web/20080128025138/http://www.webopedia.com/TERM/D/digital_watermark.html.*

Jeff Tyson, "How Movie Distribution Works", How Stuff Works website, Feb. 6, 2008, all pages, retrieved from https://web.archive.org/web/20080206182227/http://entertainment.howstuffworks.com/movie-distribution.htm/printable.*

Jen Chaney, "An Ever-Shorter Leap From Theater to DVD", Washington Post website, Mar. 13, 2005, retrived from http://www.washingtonpost.com/wp-dyn/articles/A26877-2005Mar11.html.*

Partial EP search Report—EP10152200.1—Date of completion of search Jun. 26, 2012.

Extended European Search Report—EP 10152200—Mailing Date: Oct. 26, 2012.

* cited by examiner

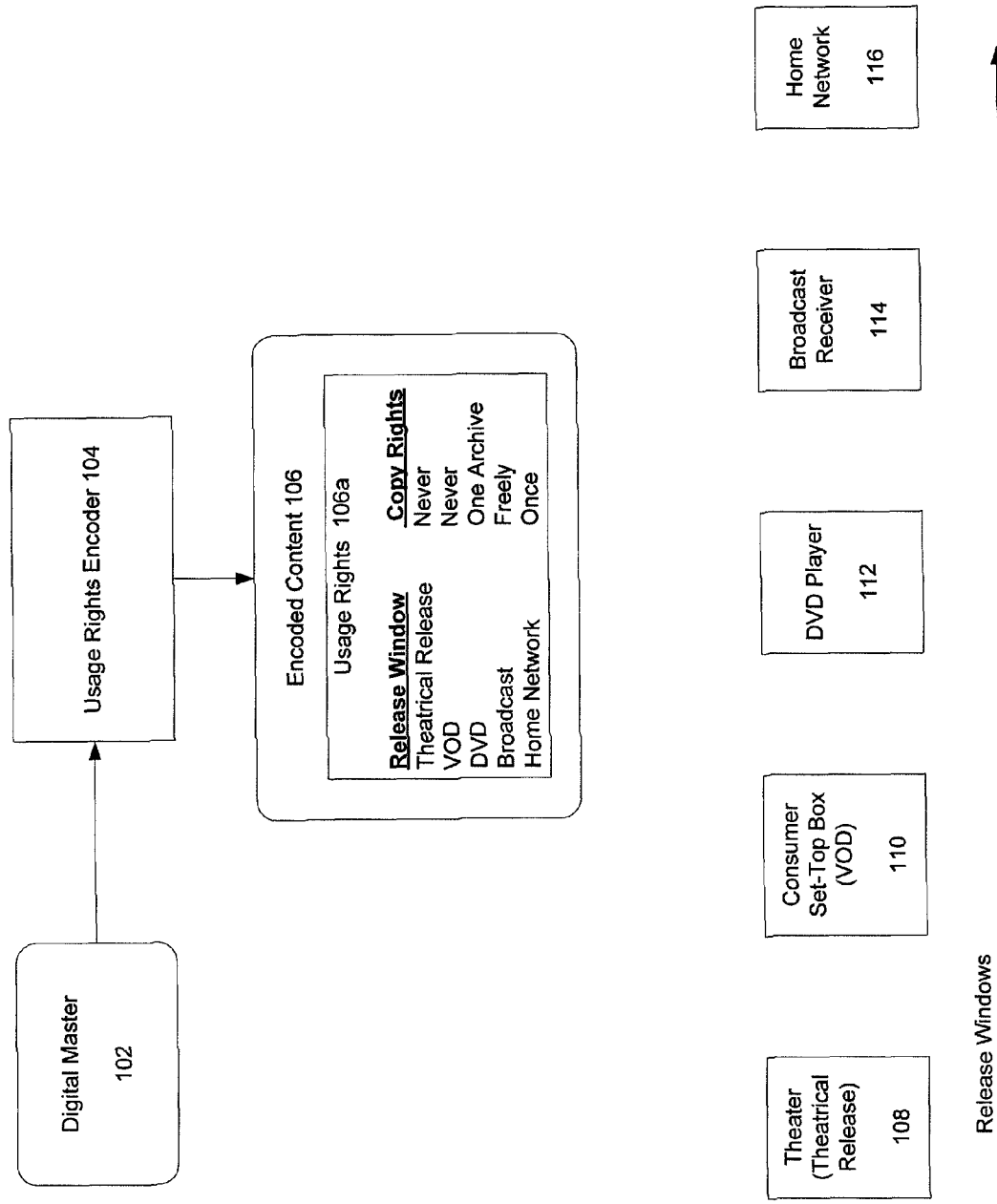

| | Theatrical Release | Premium VOD | DVD and Blu-ray DVD Release | HD Premium (HBO, Showtime, etc) | Free VOD and Standard Definition | Broadcast Networks | Home Network usage | Portable Media device distribution |
|---|---|---|---|---|---|---|---|---|
| Copy Control info (CCI) | Copy Never | Copy Never | Copy Once (archive Only) | Copy Once | Copy Freely | Copy Freely | Copy Once | Copy Once |
| Number of Copies | 0 | 0 | 0 | 1 | No Limit | No Limit | 1 | 1 |
| Image Constraint | Only on Component Analog | Only on Component Analog | Only on Component Analog | Only on Component Analog | None | None | None | None |
| DVD Write | No | Possible | No | Possible | Yes | Yes | Possible | N/A |
| Time Window for Viewing | N/A | N/A | Yes | Yes | Yes | Yes | Yes | Yes |
| Home Network Viewing | No | No | Yes | Yes | Yes | Yes | Yes | Yes |
| Re-distribution Trigger | No distribution | No distribution | No distribution | No distribution | Some | Some | No distribution | No distribution |
| Output Control | HDMI and 1394 Only | HDMI and 1394 Only | HDMI, Component, VGA, and 1394 | HDMI, Component, VGA, and 1394 | HDMI, Component, VGA, and 1394 | HDMI, Component, VGA, and 1394 | HDMI, Component, VGA, USB, Ethernet and 1394 | HDMI, Component, VGA, USB, Ethernet and 1394 |
| Portable Media Viewing Control | No | No | No | Yes | Yes | Yes | Possible | Yes |
| Flash Recording | No | No | No | Yes | Yes | Yes | Possible | Yes |
| PC Viewing | No | No | No | Yes | Yes | Yes | Possible | N/A |
| PC Recording | No | No | No | No | Yes | Yes | Possible | N/A |

Figure 2a

| Release Window | Audience | Venues / Devices | HD Content | SD Content | Rights |
|---|---|---|---|---|---|
| Theatrical Release | Theater Audience only | Theaters | N/A | N/A | None |
| International Release | | | N/A | N/A | |
| Early Release (Airlines, In-room entertainment) | Hotel Airline | Hotels and airlines | N/A | N/A | None |
| DVD Release | Home | | N/A | N/A | None |
| VOD/PPV | Home | | Hardware security plus algorithms and key management | Hardware security plus algorithms and key management | Copy Never |
| Premium Channel | Home | VCR DVD Portable PC | Minimum DigiCipher and PowerKey security plus algorithms other hardware requirements with some programmers | Software security plus algorithms and other requirements | Copy Freely |
| Non-Premium | Home | VCR DVD Portable PC | Software security plus algorithms | Software security plus algorithms | Copy Freely |

Figure 2b

SYSTEMS AND METHODS FOR SIGNALING CONTENT RIGHTS THROUGH RELEASE WINDOWS LIFE CYCLE

TECHNICAL FIELD

Aspects of the invention relate to usage rights associated with audio, video and audiovisual content. More specifically, aspects of the invention relate to methods and related systems for encoding usage rights for multiple release windows.

BACKGROUND

It is common for audio, video and audio visual content to be released in multiple release windows. For example, it is common for a movie to first be released in theaters and then to be released for video-on-demand download and even later to be released on DVD. Each release window may utilize a unique content format and provide unique usage rights challenges. For example, the quality of audio visual content released as a theatrical release is generally very high quality and consumers generally do not have access to theatrical release content files. In contrast, the quality of audiovisual content released as a DVD has lower quality. DVDs are also widely distributed and can be duplicated.

Conventional approaches to control usage of content distributed in multiple release windows utilized multiple security mechanisms. Often, a different security mechanism is utilized for each release window. These conventional approaches require the use of multiple and different technologies, policies and practices. The use of multiple technologies, policies and practices results in the process becoming manual, labor intensive, fragmented, prone to errors and inefficient. Moreover, it can be difficult to control the distribution of content when multiple entities are encoding usage rights at a variety of release windows. Translating usage rights from one format another may also be difficult or impossible. When an unauthorized use or distribution takes place, it can be difficult to determine which of the multiple entities responsible for encoding usage rights is responsible for the unauthorized use or distribution. There may also be confusion regarding which rules, if any, apply in a release window.

Thus, systems and methods that provide content usage rights mechanisms that be used with multiple release windows would be beneficial to the art.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

Various embodiments of the invention include or utilize a data structure that includes content usage rights for multiple release windows. The usage rights may be encoded in the content or otherwise kept separately and bound to the content. Playback devices are configured to access the appropriate usage rights and control usage in accordance with the usage rights.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which:

FIG. 1 illustrates a system that may be used to control the use of content, in accordance with an embodiment of the invention;

FIG. 2a illustrates an exemplary set of usage rights that may be associated with multiple release windows, in accordance with an embodiment of the invention;

FIG. 2b illustrates an alternative exemplary set of usage rights that may be associated with multiple release windows, in accordance with an embodiment of the invention;

DETAILED DESCRIPTION

Figure 3:
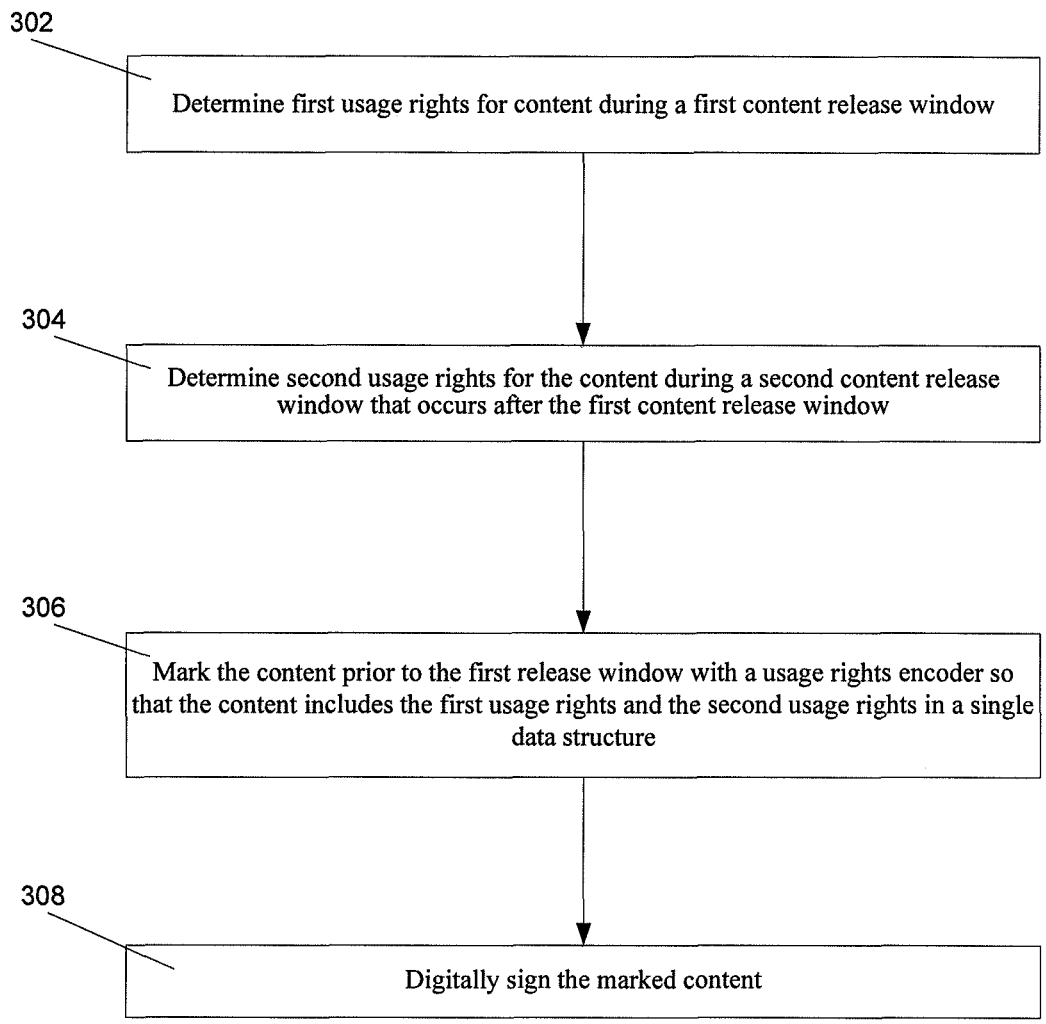
FIG. 3 illustrates a process that may be used to mark content with usage rights, in accordance with an embodiment of the invention.

FIG. 1 illustrates a system that may be used to control the use of content, in accordance with an embodiment of the invention. As used herein "content" includes audio content, video content and audiovisual content. A digital master 102 is received at a usage rights encoder 104. Digital master 102 may be implemented with a conventional master recording of audiovisual content, such as a movie. Usage rights encoder 104 may be implemented with one or more computer devices, each of which may include a memory, processor, interface ports, drives, display, speakers and other components used to receive, process and present data. Usage rights encoder 104 may be programmed with computer-executable instructions to mark digital master 102 with usage rights to create encoded content 106.

Encoded content 106 is marked with the listed usage rights 106a for multiple release windows. Usage rights 106a may be digitally signed or authorized marked or encoded to prevent altercation. In the example shown, the usage rights cover copy restrictions. For example, when content is released for a theatrical release that content may never be copied. When the content is released on DVD, a single archival copy may be generated. And, when the content is released in the broadcast release window, there are no copy restrictions on the content. One skilled in the art will appreciate that usage rights may cover a variety of different usages and conditions.

FIG. 2a illustrates an exemplary set of usage rights that may be associated with multiple release windows. Release windows are shown in row 202 and usage rights are listed in column 204. FIG. 2b illustrates an alternative exemplary set of usage rights that may be associated with multiple release windows. The usage rights shown in FIGS. 2a and 2b may be included in a header file, encoded as part of a digital watermark or may be included in a license that is associated with the content. In one embodiment, the usage rights may be included in an XML file formatted in accordance with a schema. Devices configured to read the rights included in the XML file may utilize an XML parser to identify the appropriate usage rights. Of course, other security mechanisms, including those that are not XML based, may be used to control the use of content.

The usage rights shown in FIG. 2 may be signed or otherwise authenticated. In one embodiment, a trusted source may issue a key that allows for the generation of usage rights. The key may be used to generate a new set of usage rights when an appropriate change is required.

FIG. 1 illustrates a plurality of content playback devices 108-116 that may be used to receive encoded content and present the content to users. In a first release window, a theater 108 may be used to present the content to users. Consumer set-top box 110 may be used during a video on demand (VOD) release window and a DVD player 112, broadcast receiver 114 and home network 116 may be used in other release windows. In accordance with various embodiments of the invention, the content playback devices may be programmed with computer-executable instructions or may include electronic circuits that control the use of encoded content in accordance with the appropriate usage rights 106a. For example, DVD player 112 may include an electronic circuit, such as an application-specific integrated circuit (ASIC) that accesses usage rights 106a and determines whether or not a copy of content encoded on a DVD may be copied.

Figure 4:
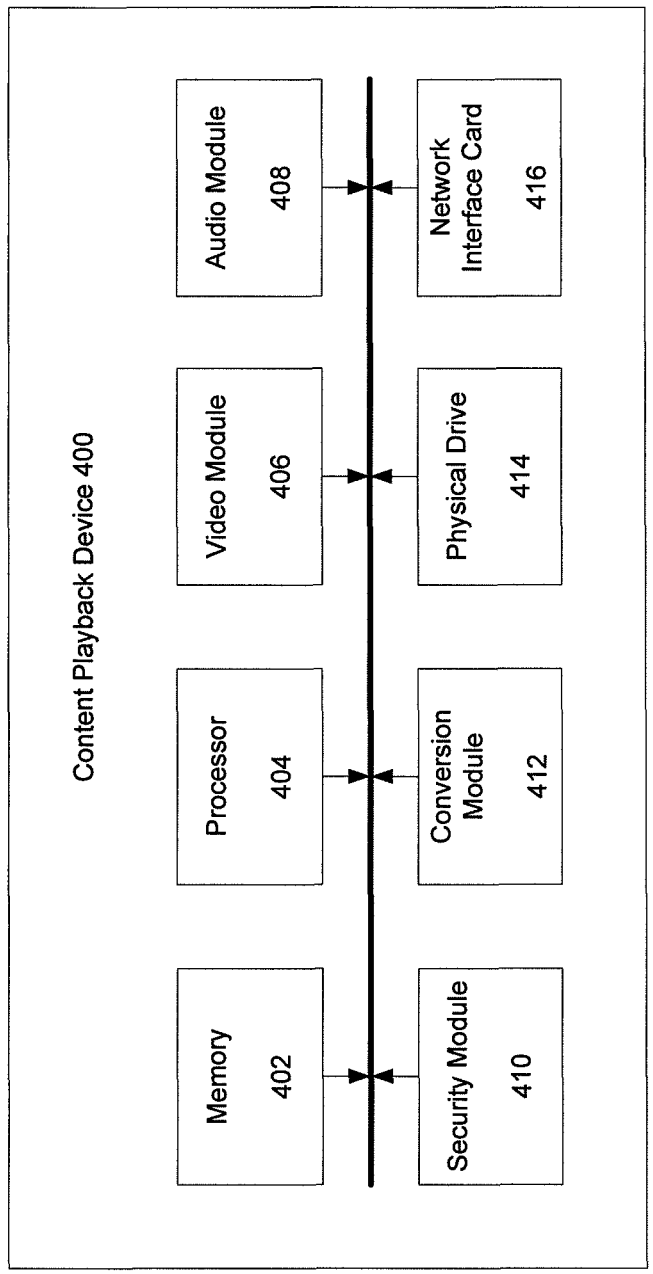
FIG. 4 illustrates a content playback device that may be used to playback content to users in accordance with embodiments of the invention.

FIG. 3 illustrates a process that may be used to mark content with usage rights. First, in step 302 usage rights for content during a first content release window are determined. In step 304 usage rights for content during a second content release window are also determined. The second content release window occurs after the first content release window. In step 306, the content is marked with a usage rights encoder so that the content includes the first usage rights and the second usage rights in a single data structure prior to the content's first release. Of course, step 306 or another step may including marking the content with additional usage rights. Marking content may include inserting the usage rights into a header file, watermarking the content, associating a license with the content or any other security mechanisms that may be used to control the use of content. Finally, in step 308 the marked content is digitally signed. Digitally signing the marked content by a trusted entity ensures that the usage rights cannot be tampered with FIG. 4 illustrates a content playback device 400 that may be used to playback content to users, in accordance with embodiments of the invention. Content playback device 400 may be implemented with a projector, set-top box, DVD player, broadcast receiver, computer device, portable media device, MP3 player, mobile telephone or any other electronic device that can be configured to present audio, video or audiovisual content to users. A memory 402 may be used to store computer-executable instructions and data. Memory 402 may be implemented with a read-only memory, random access memory or combination. A processor 404 may be used to execute computer-executable instructions and control the overall operation of content playback device 400. A video module 406 may be included to generate and provide video signals to a display device. An audio module 408 may be used to generate and provide audio signals for playback through one or more speakers or headphones.

Content playback device 400 may also include a security module 410 that may be included to control the usage of content. In one example, security module 410 is implemented with an integrated circuit that is configured to access a table of usage rights associated with multiple content release windows, determine the appropriate usage rights corresponding to the current release window and control usage of the content. A conversion module 412 may be included to convert content from one format to another. For example, conversion module 412 may be used to convert or transcode audiovisual content included on a DVD into lower quality content that may be played back on a portable media device, such as a mobile telephone. In various embodiments of the invention the operation of conversion module 412 may be governed by security module 410. In some embodiments, as content is converted to lower quality content higher level release window usage rights are not included or associated with the content. The data structure that includes content rights may also include a pointer that points to usage rights for an appropriate release window. For example, when a DVD is created, a pointer in the data structure may be positioned to point to the usage rights for the DVD release window. In various embodiments cryptography or a digital signature capability of cryptography are used to control a pointer to the usage rights. In some embodiments the only rights visible are the rights corresponding to the current release window. In an alternative embodiment a separate usage rights file may be created and cryptographically bound to the content using the GUID (content ID) or some other identifier. This embodiment may require that the usage rights are only able to be opened and applied to the one content ID that is bound to the usage rights file. The ID can be hashed and interlocked using an encryption or signing key with the content.

A physical drive 414 may be included to read content stored on physical devices, such as CDs or DVDs. A network interface card 416 may be included to connect content playback device to a network. The network may be a local area network or a wide-area network, such as the Internet.

While the exemplary embodiments have been discussed in broad terms of a cable communications networking environment, the invention, however, may be configured for other networking environments including telecommunications environments.

I claim:

1. A method comprising:
   determining, by a computing device, first usage rights that control usage of content for a first period of time during which the content is released to a first playback device;
   determining second usage rights that control usage of the content for a second period of time during which the content is released to a second playback device different from the first playback device; and
   prior to the first period of time and the second period of time, marking, by a processor, the content with a single data structure that comprises the first usage rights and the second usage rights.

2. The method of claim 1, wherein the first playback device and the second playback device are configured to output the content through different distribution channels.

3. The method of claim 1, wherein the first usage rights comprise a redistribution trigger indicating at least one of: the content is not distributable or limited rights to distribute the content.

4. The method of claim 1, wherein the first usage rights comprise copy control information indicating rights to at least one of: freely copy the content or never copy the content.

5. The method of claim 1, wherein the first usage rights comprise at least one of viewing restrictions or output control restrictions.

6. The method of claim 1, wherein the marking of the content comprises watermarking the content with the first usage rights and the second usage rights.

7. The method of claim 1, wherein the marking of the content comprises inserting the first usage rights and the second usage rights in an extensible markup language (XML) file.

8. The method of claim 1, wherein the marking of the content comprises cryptographically binding the single data structure to the content.

9. The method of claim 1, further comprising digitally signing the content after it is marked.

\* \* \* \* \*